(12) United States Patent
Hoshina et al.

(10) Patent No.: US 12,225,166 B2
(45) Date of Patent: Feb. 11, 2025

(54) PRINTING DEVICE

(71) Applicant: SEIKO EPSON CORPORATION, Tokyo (JP)

(72) Inventors: Makoto Hoshina, Nagano (JP); Ichiro Yoshioka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/331,214

(22) Filed: Jun. 8, 2023

(65) Prior Publication Data

US 2023/0403360 A1  Dec. 14, 2023

(30) Foreign Application Priority Data

Jun. 10, 2022 (JP) ................. 2022-094139

(51) Int. Cl.
*H04N 1/00* (2006.01)

(52) U.S. Cl.
CPC ..... *H04N 1/00496* (2013.01); *H04N 1/00397* (2013.01); *H04N 1/00519* (2013.01)

(58) Field of Classification Search
CPC ........... H04N 1/00496; H04N 1/00397; H04N 1/00519
See application file for complete search history.

(56) References Cited

U.S. PATENT DOCUMENTS

| | | | | |
|---|---|---|---|---|
| 4,996,561 | A * | 2/1991 | Yoshimura | G03G 15/5016 399/107 |
| 5,844,543 | A * | 12/1998 | Tamura | G06F 1/162 345/905 |
| 2010/0006350 | A1* | 1/2010 | Elias | G06F 3/0445 178/19.03 |
| 2012/0274957 | A1* | 11/2012 | Sugiura | H04N 1/00384 358/1.9 |
| 2013/0169601 | A1* | 7/2013 | Mo | G06F 3/0383 345/179 |
| 2014/0071097 | A1* | 3/2014 | Namie | G06F 1/1607 345/179 |
| 2015/0097101 | A1* | 4/2015 | Mccafferty | G07F 9/023 248/550 |
| 2017/0102739 | A1* | 4/2017 | Zaloom | G06F 3/0393 |
| 2017/0111526 | A1* | 4/2017 | Nakamura | H04N 1/00551 |
| 2017/0310836 | A1* | 10/2017 | Nakayama | H04N 1/00411 |
| 2018/0213097 | A1 | 7/2018 | Seike | |
| 2021/0200331 | A1* | 7/2021 | Sayers | G06F 3/03545 |
| 2021/0247856 | A1* | 8/2021 | Wang | G06F 3/0362 |

FOREIGN PATENT DOCUMENTS

JP  2018-120329 A  8/2018

* cited by examiner

*Primary Examiner* — David Tung
(74) *Attorney, Agent, or Firm* — Global IP Counselors, LLP (57) ABSTRACT

A printing device includes: a case covering a printing mechanism; and an electrostatic touch panel provided at the case. The touch panel is provided at an angle from horizontal. At a bottom side of the touch panel, a wall for stopping a touch pen rolling down a surface of the touch panel is provided.

21 Claims, 6 Drawing Sheets

PRINTING DEVICE

The present application is based on, and claims priority from JP Application Serial Number 2022-094139, filed Jun. 10, 2022, the disclosure of which is hereby incorporated by reference herein in its entirety.

BACKGROUND

1. Technical Field

The present disclosure relates to a printing device.

2. Related Art

A printing device having a touch panel as an input unit is known. JP-A-2018-120329 discloses a multifunction peripheral having a touch panel and a light-shielding panel where buttons are arranged.

A printing device having a capacitive touch panel is less responsive, for example, when operated by a gloved hand. Therefore, a touch pen may be used for the printing device. Recently, a touch pen has been used on many more occasions in this way. It is desired to improve the convenience of the printing device using a touch pen.

SUMMARY

According to an aspect of the present disclosure, a printing device includes: a case covering a printing mechanism; and an electrostatic touch panel provided at the case. The touch panel is provided at an angle from horizontal. At a bottom side of the touch panel, a wall having a greater height from a touch panel face than at least one of a left side, a right side, and an upper side, is provided.

DESCRIPTION OF EXEMPLARY EMBODIMENTS

Figure 1:
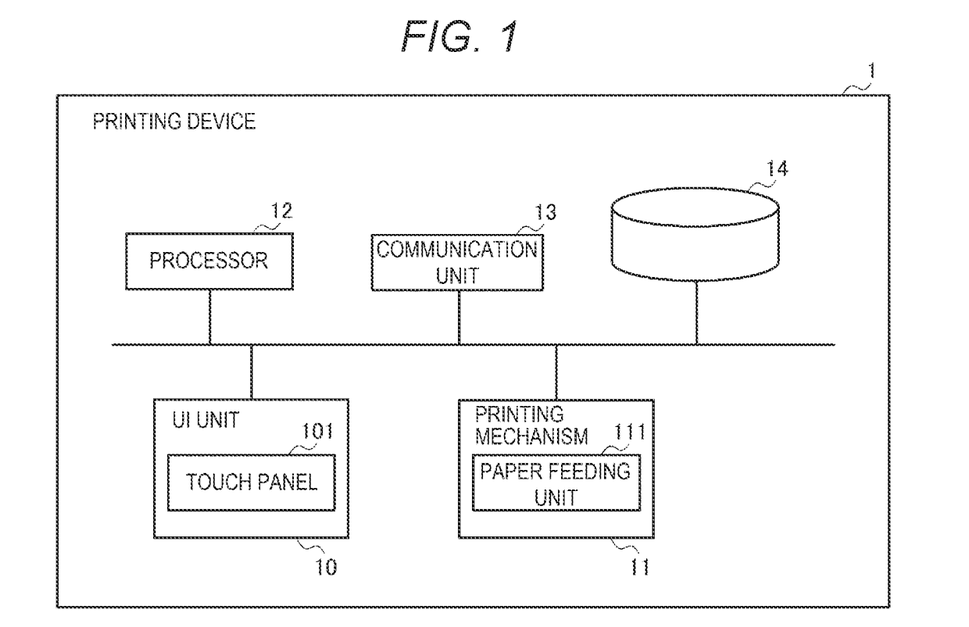
FIG. 1 shows a schematic configuration of a printing device.

FIG. 1 shows a schematic configuration of a printing device. A printing device 1 has a UI unit 10, a printing mechanism 11, a processor 12, a communication unit 13, and a non-volatile memory 14. The UI unit 10 includes a touch panel display (hereinafter referred to as a touch panel) 101. The UI unit 10 also includes various keys and switches or the like. The touch panel 101 has a display panel displaying various information, for example, the status of the printing device 1 and the remaining amount of ink or the like, and a touch detection panel superimposed on the display panel, and thus detects a touch operation with a human finger, a touch pen or the like. The touch panel 101 is a capacitive LCD (liquid crystal display). The content of an operation on the UI unit 10 by a user is sent to the processor 12.

The printing mechanism 11 executes printing. The printing method by the printing mechanism 11 is not particularly limited. For example, an inkjet method, an electrophotographic method or the like is employed. The printing mechanism 11 has a paper feeding unit 111 and also has an actuator, various devices, a sensor, a drive circuit, a mechanical component and the like for executing printing on various media.

The processor 12 has a CPU, a ROM, a RAM and the like, not illustrated. The processor 12 executes various programs recorded in the non-volatile memory 14 and thus controls each part of the printing device 1. The communication unit 13 includes a communication interface for communicating with an external device in conformity with various wired or wireless communication protocols. The printing device 1 communicates with another device via the communication unit 13. The communication unit 13 includes an interface for communicating with various removable memories attached to the printing device 1.

Figure 2:
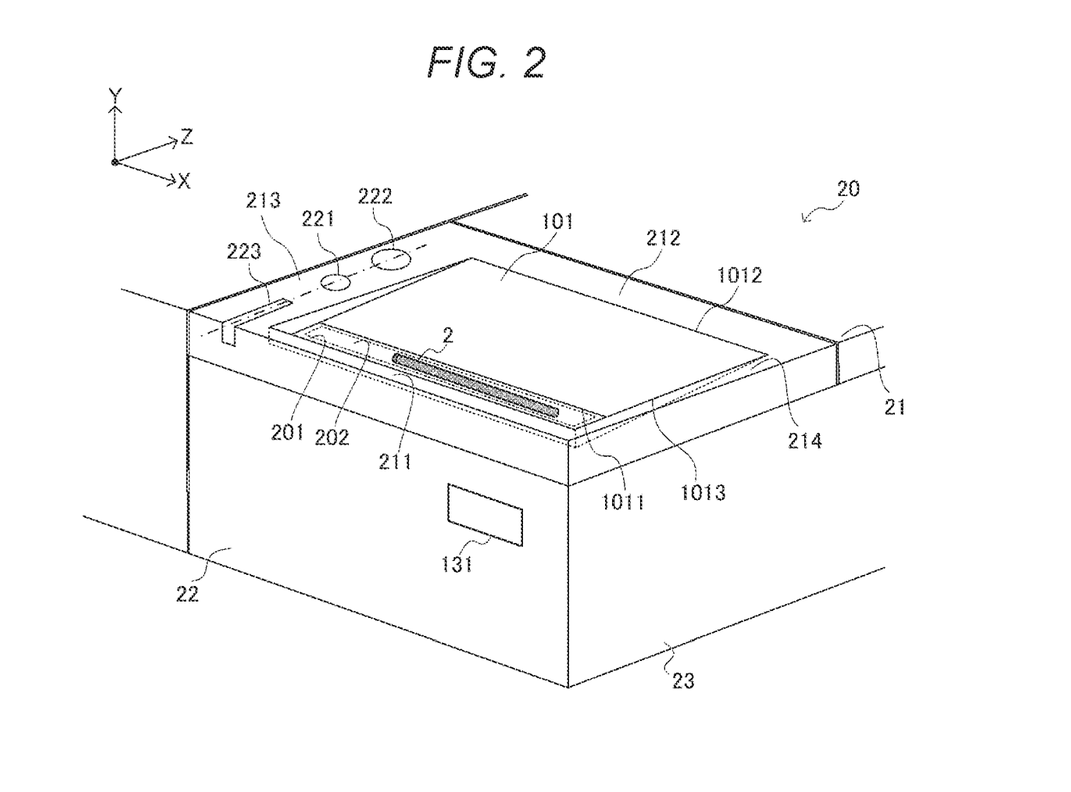
FIG. 2 shows an external appearance of a part of a case.

FIG. 2 shows an external appearance of a part of a case 20 of the printing device 1 according to this embodiment. The printing mechanism 11, the processor 12 and the like are covered by the case 20. An X-axis direction in a three-dimensional coordinate system shown in FIG. 2 is defined as a lateral direction of the printing device 1. A Y-axis direction (vertical direction on the sheet) is defined as a direction of height of the printing device 1. A Z-axis direction is defined as a direction of depth of the printing device 1. A positive direction along the X-axis is referred to as right. A negative direction along the X-axis is referred to as left. A position direction along the Z-axis is referred to as back. A negative direction along the Z-axis is referred to as front.

A top face 21 of the case 20 is a face on the upper side of the printing device 1. A front face 22 is a face facing the user of the printing device 1 in the state where the printing device 1 is installed. A right side face 23 is a face on the right side when one is facing the printing device 1. The touch panel 101 is provided at the top face 21. The touch panel 101 is a rectangular panel and is arranged in such a way that a lower side 1011 and an upper side 1012 thereof are parallel to the front face 22.

In this embodiment, the touch panel 101 is provided, inclined downward of the vertical direction (negative direction along the Y-axis) from the back toward the front of the printing device 1 in relation to the top face 21. Also, on the side of the lower side 1011 of the touch panel 101, a pen holder part 201 continued from the surface of the touch panel 101 is formed. The pen holder part 201 is a space for placing a touch pen 2. The pen holder part 201 is a planar face extending to a front side edge part 211 coupled to the front face 22, of the top face 21, and is an example of a lower side face. The front side edge part 211 is an example of a wall. A contactless charging mechanism 202 is provided in the pen holder part 201. Thus, the touch pen 2 can be charged in the pen holder part 201. The touch pen 2 may be an accessory of the printing device 1 or may be a commonly available product purchased by the user.

Figure 3:
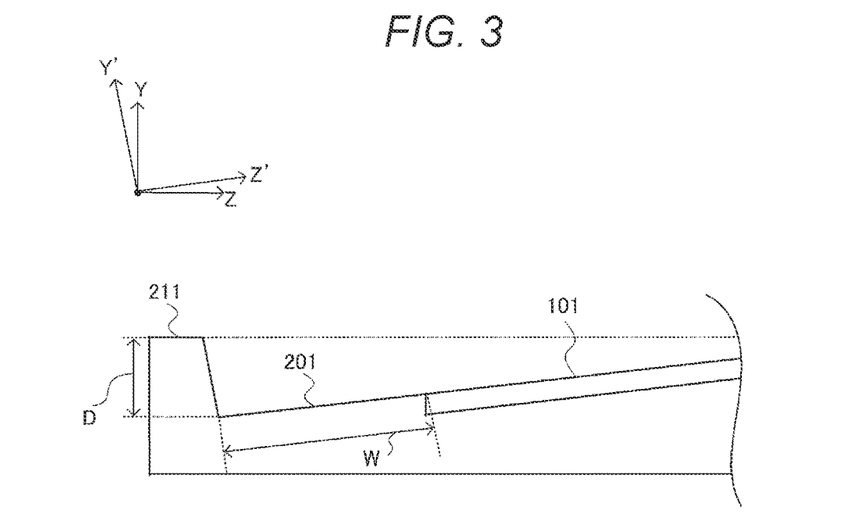
FIG. 3 is a cross-sectional view showing a part of a touch panel and a pen holder part.

FIG. 3 is a cross-sectional view showing a part of the touch panel 101 and the pen holder part 201. As shown in FIG. 3, the surface of the touch panel 101 and the pen holder part 201 are provided, continuing from each other so as to be flush with each other. That is, the pen holder part 201 is provided on the plane including the surface of the touch panel 101 and is formed, inclined downward of the vertical direction in relation to the top face 21. As the touch panel 101 is thus arranged with an inclination, the visibility of the touch panel 101 can be improved. Hereinafter, the surface of the touch panel 101 and the pen holder part 201, and an extended face from these parts, are referred to as a touch panel face.

As described above, on the side of the lower side 1011 of the touch panel 101, the pen holder part 201 is provided and the front side edge part 211 is provided as well. The front side edge part 211 is provided to be flush with the top face 21. That is, the height of the touch panel face in the vertical direction (Y-axis direction) is the greatest at this point, of the peripheral edges of the touch panel 101. Since the front side edge part 211 protrudes from the pen holder part 201 in this way, the touch pen 2 used to operate the touch panel 101 can be placed in the pen holder part 201. When the user places the touch pen 2 on the touch panel 101, the touch pen 2 rolls down and stops at the front side edge part 211 and is thus settled in the pen holder part 201.

Preferably, the inclination of the touch panel 101 and the pen holder part 201 in relation to the top face 21 may be, for example, approximately 2 degrees. If the inclination of the touch panel 101 and the pen holder part 201 from the top face 21 is greater, the touch pen 2 gains momentum when rolling down, and may go beyond the front side edge part 211 and drop down, which is not preferable.

In view of placing the touch pen 2, preferably, a width W of the pen holder part 201 in the direction of depth (Z-axis direction) of the touch panel face may be 15 mm or greater. Thus, an erroneous operation due to the user touching the touch panel 101 by mistake when picking up the touch pen 2 placed in the pen holder part 201 can be prevented.

When the touch pen 2 accessory to the printing device 1 is provided along with the printing device 1, the pen holder part 201 may be formed in such a way that a depth D thereof is greater than half the thickness of the touch pen 2. Also, preferably, the depth D of the pen holder part 201 may be greater than 2 mm. The depth D of the pen holder part 201 is the distance in the Y-axis direction from the lowest position in the vertical direction (lowest position in the Y-axis direction) of the pen holder part 201 to the highest position in the vertical direction of the front side edge part 211. As the depth D of the pen holder part 201 is made greater than 2 mm in this way, the touch pen 2 placed in the pen holder part 201 can be prevented from going beyond the front side edge part 211 and dropping down. The depth D corresponds to the height of the wall from the pen holder part 201 as the lower side face.

In another example, the front side edge part 211 may be formed to extend further upward in the vertical direction than the top face 21. That is, the front side edge part 211 may be provided to be higher than the height of the top face 21. If the front side edge part 211 is higher, it is advantageous in that the front side edge part 211 can more easily stop the touch pen 2 rolling down with momentum.

To the left and right of the touch panel 101, a left side edge part 213 and a right side edge part 214 are provided, respectively. On the side of the upper side 1012 of the touch panel 101, a back edge part 212 is provided. All of the left side edge part 213, the right side edge part 214, and the back edge part 212 are provided to be flush with the top face 21.

At the left side edge part 213, a first switch 221 and a second switch 222, which are mechanical switches, are provided. The first switch 221 is a power switch. The second switch 222 is a home switch. The home switch is an operation unit for accepting an instruction to return the display on the touch panel 101 to a basic screen.

The second switch 222 provided nearer to the back (in the position direction along the Z-axis) than the first switch 221 is located at the bottom of a recess and thus provided at a lower position in the vertical direction (Y-axis direction) than the first switch 221. That is, the second switch 222 is provided at a deeper position than the first switch 221. As the second switch 222 is thus provided at a deeper position than the first switch 221, an erroneous operation on the second switch 222 can be prevented. Also, both the first switch 221 and the second switch 222 are provided at an upper position in the vertical direction (Y-axis direction) than the touch panel face, compared with a touch panel face located at the same position in the Z-axis direction as these switches. Thus, an erroneous operation by the user is even less likely to occur.

The printing device 1 may have a plurality of mechanical switches. The number and types of mechanical switches are not limited to the number and types given in the embodiment. The plurality of mechanical switches may include at least one of a power switch, a power-saving switch, a print stop switch, and a home switch.

Also, a light-emitting unit 223 extending from the left side edge part 213 to the front face 22 is provided. The light-emitting unit 223 is implemented by an LED or the like and notifies the user of the status or the like of the printing device 1. The light-emitting unit 223 is provided extending over the two faces and is therefore visible from a broad range. The first switch 221, the second switch 222, and the light-emitting unit 223 are arranged along a straight line extending in the Z-axis direction. That is, the light-emitting unit 223 is arranged along the direction in which the mechanical switches are arrayed. Thus, the visibility and aesthetic appearance can be improved.

The positional relationship between the touch panel 101 and other components will now be described, referring to FIG. 2. The printing mechanism 11 and the like are covered by the case 20. The paper feeding unit 111 of the printing mechanism 11 is arranged in such a way that the direction of depth of the printing device 1 (Z-direction) is a direction of insertion of the paper feeding unit 111. Also, a sub scanning direction of the printing mechanism 11 corresponds to the direction of depth (Z-direction). That is, the direction of insertion of the paper feeding unit 111 and the sub scanning direction of the printing mechanism 11 are perpendicular to the lateral side of the touch panel 101 and to the vertical direction.

In another example, the printing mechanism 11 may be arranged in such a way that a main scanning direction thereof is perpendicular to the lateral side of the touch panel 101 and to the vertical direction.

On the front face 22, a connector 131 for coupling a removable memory is provided. The connector 131 is arranged at a position on the front face 22 within a range where the touch panel 101 is arranged in the lateral direction (X-direction). Since the components to be operated by the user such as the touch panel 101 and the connector 131 are collectively arranged, operability can be improved.

As described above, in the printing device 1 according to the embodiment, the touch panel 101 is provided, inclined downward of the vertical direction. On the lower side of the touch panel 101, the pen holder part 201 is provided and the front side edge part 211 is provided as well. Thus, the touch pen 2 used to operate the touch panel 101 can be placed in the pen holder part 201.

The above embodiment is an example for implementing the present disclosure. Various other embodiments can be employed. Various modifications and changes, such as applying one modification example to another modification example, can be made within the scope of the present disclosure described in the claims.

In a first modification example, while the printing device printing on a paper medium is employed as an example in the above embodiment, the medium to print on is not limited to paper and may be, for example, cloth or the like.

Figure 4:
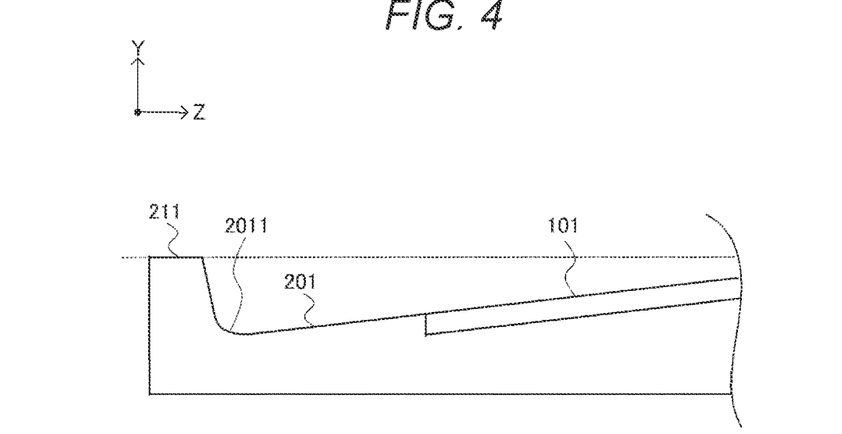
FIG. 4 shows a curved surface part of the pen holder part.
Figure 5:
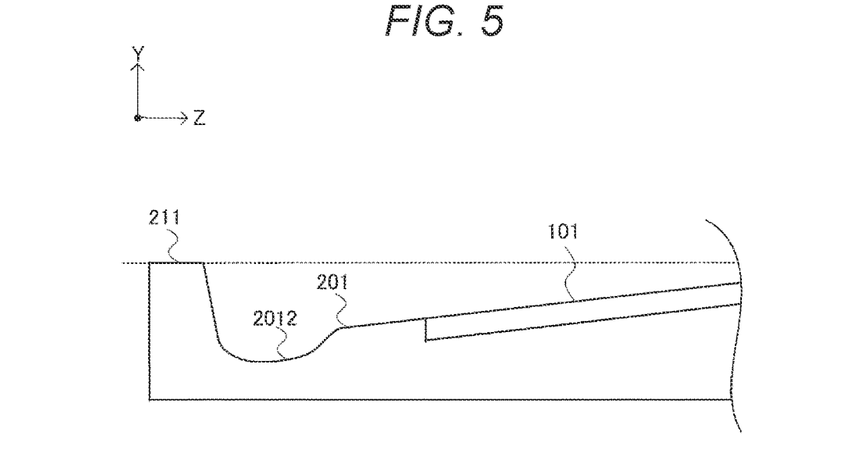
FIG. 5 shows a recess in the pen holder part.

In a second modification example, the pen holder part 201 may have, at least at a part thereof, a curved surface part 2011 with a cross section thereof forming a curved line, as shown in FIG. 4. Thus, when the user grips the touch pen 2 placed in the pen holder part 201, the touch pen 2 moves along the curved surface and therefore the user can smoothly grip the touch pen 2. In another example, the pen holder part 201 may be formed in such a way as to form a curved line from the lower side 1011 of the touch panel 101 to the front side edge part 211. In still another example, the pen holder part 201 may be formed in the shape of a curved surface with a cross section thereof forming a recess 2012 from the lower side 1011 toward the front side edge part 211, as shown in FIG. 5. Thus, the touch pen 2 can be prevented from moving toward the touch panel 101.

Figure 6:
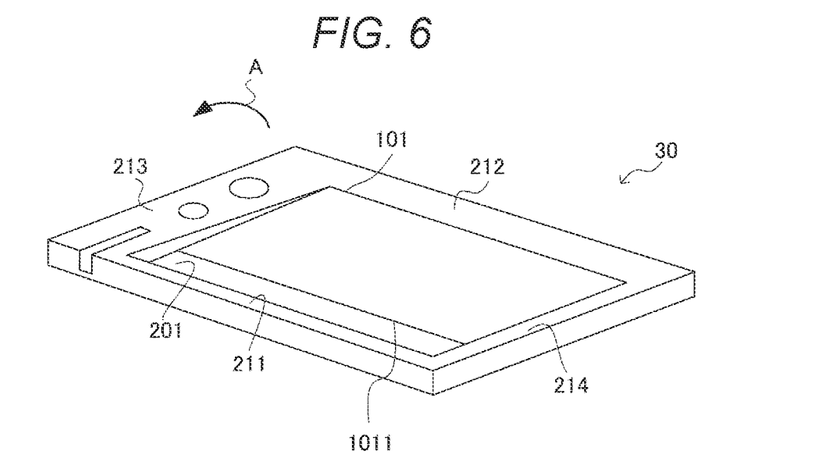
FIG. 6 shows a touch panel unit.

In a third modification example, the touch panel 101, the pen holder part 201, the front side edge part 211, the back edge part 212, the left side edge part 213, and the right side edge part 214 may be formed in a unified manner as a touch panel unit 30, as shown in FIG. 6. The touch panel unit 30 may tilt in such a way that the back edge part 212 turns upward of the vertical direction as indicated by an arrow A about the front face 22 side (front side edge part 211 side) via a tilt mechanism.

Figure 7:
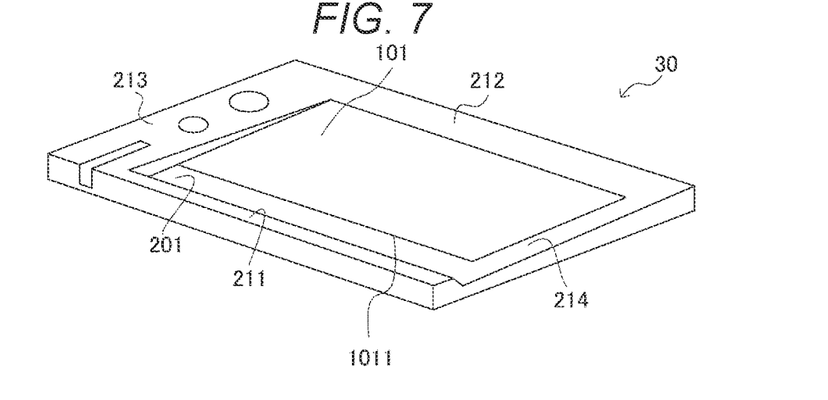
FIG. 7 shows a right side edge part.

In a fourth modification example, the right side edge part 214 may be provided on the plane including the surface of the touch panel 101, as shown in FIG. 7. That is, the right side edge part 214 may be provided, inclined downward of the vertical direction from the back to the front of the printing device 1. Also, the right side edge part 214 itself may be absent. In this case, there is no edge at the right end of the pen holder part 201. Therefore, even when the length of the touch pen 2 is longer than the length in the lateral direction of the pen holder part 201, the touch pen 2 can be placed in the pen holder part 201. Also, dust or the like accumulated on the touch panel 101 and the pen holder part 201 can be eliminated via the right side edge part 214.

In the above embodiment, the touch panel 101 is arranged at the right end of the top face 21. However, the touch panel 101 may be arranged at the left end of the top face 21. In this case, the left side edge part 213 may be provided on the plane including the surface of the touch panel 101. In this way, preferably, the edge part connecting to the side face (right side face 23, or left side face, not illustrated) may be provided on the plane including the surface of the touch panel 101. Also, not only the edge part connecting to the side face but also all of the back edge part 212, the left side edge part 213, and the right side edge part 214 may be provided on the plane including the surface of the touch panel 101. All of the back edge part 212, the left side edge part 213, and the right side edge part 214 may be absent.

When the left side edge part 213 is provided on the same plane as the touch panel 101, preferably, the first switch 221, the second switch 222, and the light-emitting unit 223 may be provided at the right side edge part 214. In this way, preferably, the edge connecting to the side face, of the left side edge part 213 and the right side edge part 214, may be provided on the same plane as the touch panel 101, and the mechanical switches and the light-emitting unit may be arranged at the other edge part.

Figure 8:
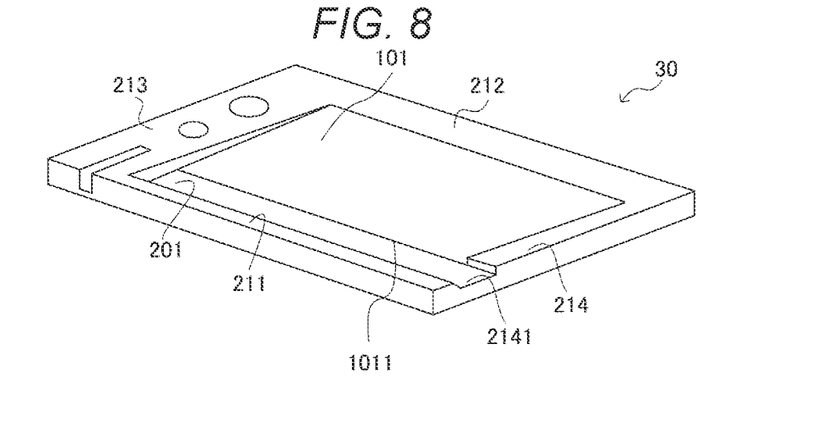
FIG. 8 shows a cut-out in the right side edge part.
Figure 9:
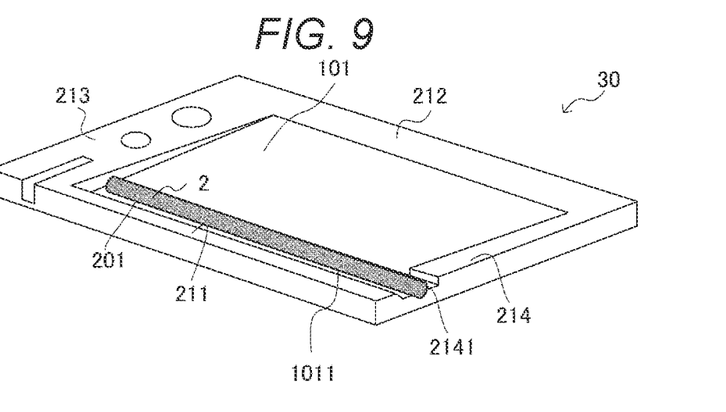
FIG. 9 shows a state where a touch pen is placed in the cut-out in the right side edge part.

In a fifth modification example, a cut-out 2141 may be formed at a position corresponding to the pen holder part 201, in the right side edge part 214, as shown in FIGS. 8 and 9. FIG. 8 shows the cut-out 2141 in the state where the touch pen 2 is not placed. FIG. 9 shows the cut-out 2141 in the state where the touch pen 2 is placed. Since the cut-out 2141 is formed, the touch pen 2 can be placed in the pen holder part 201 even when the length of the touch pen 2 is longer than the length in the lateral direction of the pen holder part 201. Preferably, the cut-out 2141 may be formed up to the same plane as the pen holder part 201. Also, preferably, the cut-out 2141 may be formed with a greater width than the thickness of the touch pen 2.

When the touch panel 101 is arranged at the left end of the top face 21, as described above, a cut-out may be formed at a position corresponding to the pen holder part 201, in the left side edge part 213. In this way, preferably, the cut-out may be formed at the position corresponding to the pen holder part 201, in the edge part connecting to the side face.

Also, when the cut-out is formed in the left side edge part 213, preferably, the first switch 221, the second switch 222, and the light-emitting unit 223 may be provided at the right side edge part 214. In this way, preferably, the cut-out may be formed at the edge part connecting to the side face, of the left side edge part 213 and the right side edge part 214, and the mechanical switches and the light-emitting unit may be arranged at the other edge part. Thus, dust or the like can be prevented from falling on the mechanical switches or the like, when being eliminated via the cut-out.

Figure 10:
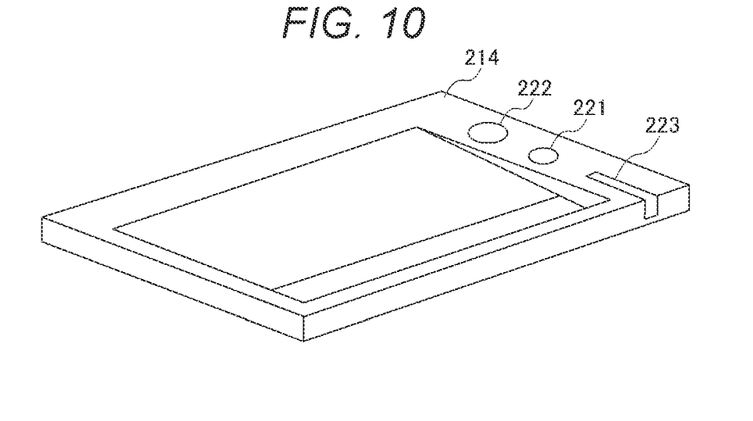
FIG. 10 shows an example where a mechanical switch and a light-emitting unit are arranged the right side edge part.
Figure 11:
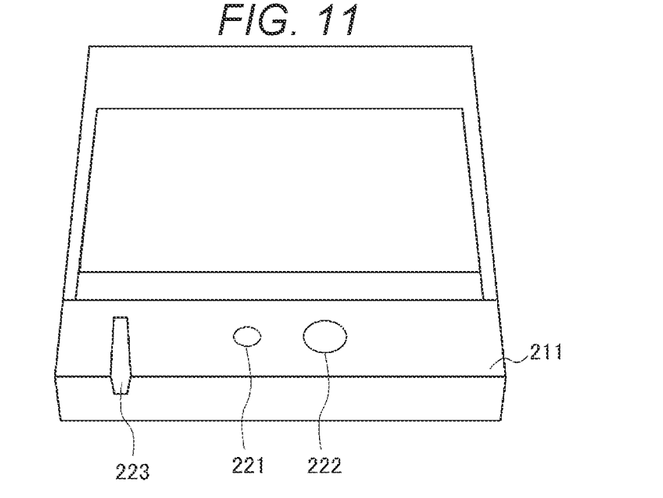
FIG. 11 shows an example where a mechanical switch and a light-emitting unit are arranged at a front edge part.
Figure 12:
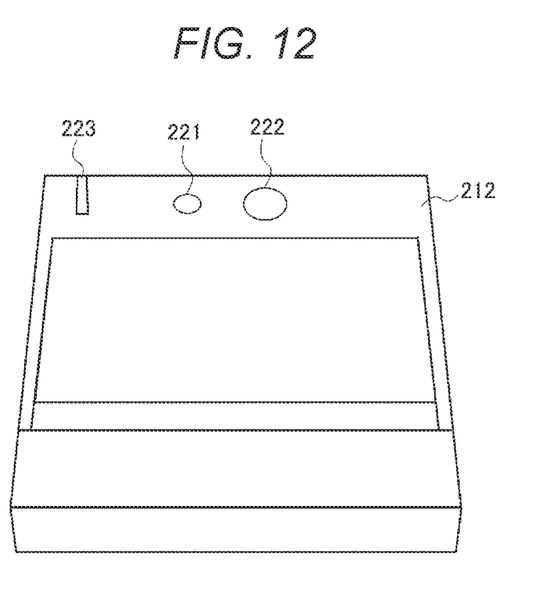
FIG. 12 shows an example where a mechanical switch and a light-emitting unit are arranged at a back edge part.

In a sixth modification example, the first switch 221, the second switch 222, and the light-emitting unit 223 may be arranged around the touch panel 101, and the positions where these parts are arranged are not limited to the positions given in the embodiment. For example, the first switch 221, the second switch 222, and the light-emitting unit 223 may be arranged at the right side edge part 214, as shown in FIG. 10. In another example, the first switch 221, the second switch 222, and the light-emitting unit 223 may be arranged at the front side edge part 211, as shown in FIG. 11. In still another example, the first switch 221, the second switch 222, and the light-emitting unit 223 may be arranged at the back edge part 212, as shown in FIG. 12.

Figure 13:
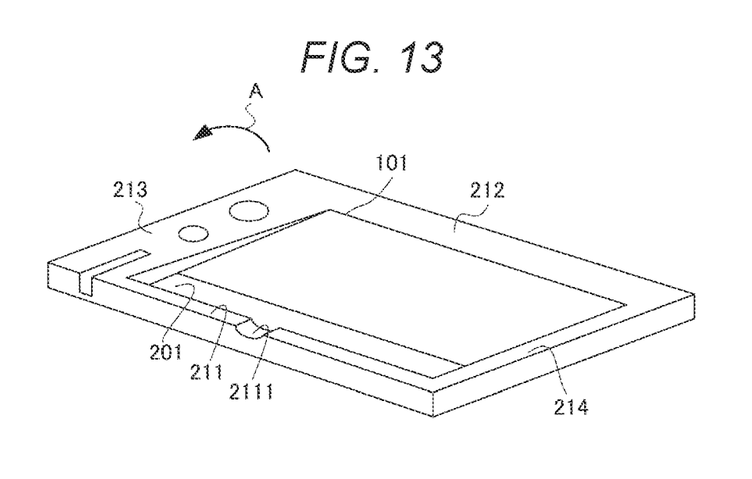
FIG. 13 shows a cut-out in the front edge part.

In a seventh modification example, a cut-out 2111 may be formed at least at a part of the front side edge part 211, as shown in FIG. 13. The cut-out 2111 is formed in a size to fit a finger into it. Thus, the user can put a finger in the cut-out 2111 and thus grip the touch pen 2 placed in the pen holder part 201. Specifically, the user puts a thumb in the cut-out 2111 and puts an index finger to the touch panel 101 side of the touch pen 2, and thus can grip the touch pen 2. Therefore, the length in the short-side direction of the pen holder part 201 required for gripping the touch pen 2 may be short. Thus, a touch by mistake on the touch panel 101 can be prevented.

Figure 14:
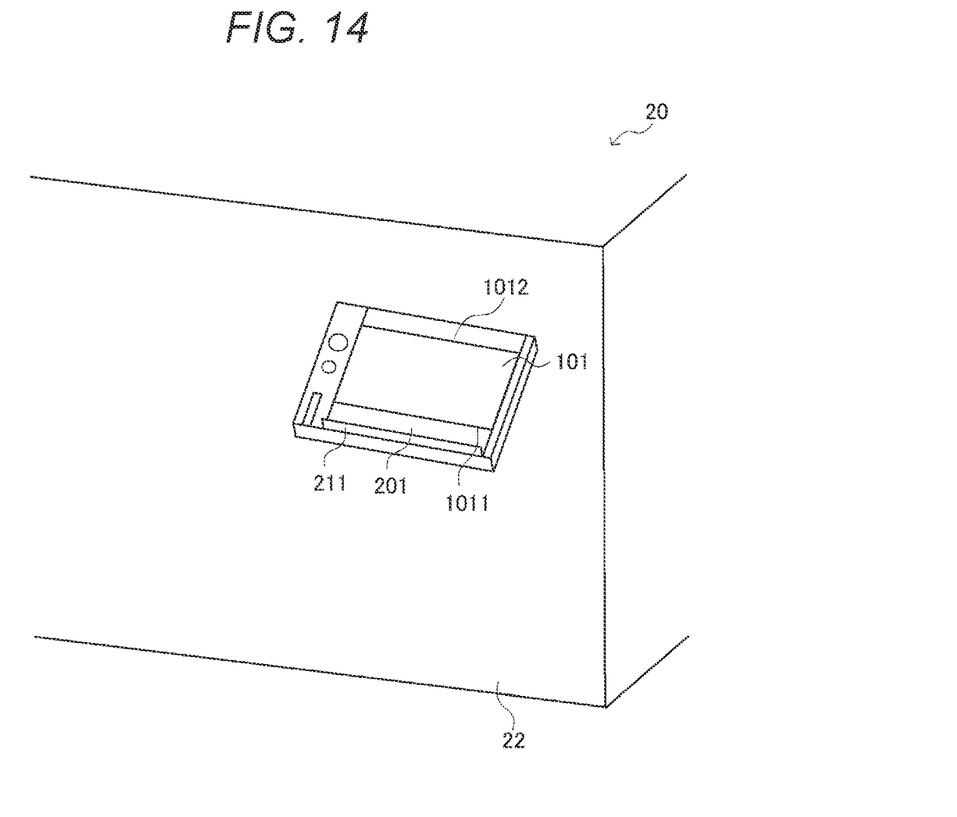
FIG. 14 shows a touch panel arranged at a front face.

In an eighth modification example, the touch panel 101 may be arranged at the front face 22, as shown in FIG. 14. In this case, too, the touch panel 101 is arranged in such a way that the front side is inclined downward of the vertical direction, and on the side of the lower side 1011 of the touch panel 101, the pen holder part 201 is provided and the front side edge part 211 is provided as well. Also, the touch panel 101 may be arranged as the touch panel unit 30, and when not in use, the touch panel 101 may be accommodated in such a way as to be parallel to the front face 22. In this case, the touch panel unit 30 tilts about the side of the upper side 1012 of the touch panel 101.

In a ninth modification example, the left side edge part 213 of the touch panel may have a protrusion and thus may be higher than the front side edge part 211. Even in this case, the touch pen 2 may be stopped by making the front side edge part 211 particularly high, specifically by making the front side edge part 211 higher than one of the back edge part 212 and the right side edge part 214 of the touch panel. The same applies to the other directions. It can be said that the front side edge part 211 has a greater height from the touch panel face than at least one of the back edge part 212, the left side edge part 213, and the right side edge part 214.

The foregoing embodiment should not limit the present disclosure. The embodiment includes a plurality of technical ideas having different effects. Therefore, one problem or effect that can be understood from the embodiment is not necessarily the problem or effect of all the technical ideas included in the embodiment. For example, of course, the first switch 221 and the second switch 222 may be at the same position in the vertical direction (Y-axis direction). At least one of the first switch 221 and the second switch 222 may be at the same height as the touch panel face.

What is claimed is:

1. A printing device comprising:
   a case covering a printing mechanism, the case having at least a front surface and a top surface with an opening;
   a paper feeding unit that is inserted into the case from a side of the front surface in an insert direction that is a direction from a front toward a back, and
   an electrostatic touch panel that is surrounded by the top surface of the case within the opening, such that an edge of the touch panel is inclined relative to an adjacent edge of the top surface that partially defines the opening and is adjacent to the edge of the touch panel,
   the case further having a wall that is disposed at a lower side of the touch panel and is positioned closer to the front surface than the touch panel is, in an opposite direction opposite to the insert direction, the wall including a top portion that has a part of the top surface and is located higher than a touch panel face at least one of a left side, a right side, and an upper side of the touch panel, and
   the edge of the touch panel being inclined relative to the adjacent edge of the top surface such that a distance between the edge of the touch panel and the adjacent edge of the top surface increases as the edge of the touch panel approaches the wall.

2. The printing device according to claim 1, further comprising:
   a lower side face disposed at the lower side of the touch panel between the touch panel and the wall.

3. The printing device according to claim 2, wherein the lower side face is a face extending from the touch panel to the wall and is at least partly a curved surface.

4. The printing device according to claim 2, wherein a width of the lower side face in an up-down direction of the touch panel is 15 mm or more.

5. The printing device according to claim 2, wherein the lower side face is a curved surface depressed from the touch panel toward the wall.

6. The printing device according to claim 2, wherein the height of the wall from the lower side face is greater than 2 mm.

7. The printing device according to claim 2, further comprising:
   a touch pen used for an input to the touch panel, wherein the height of the wall from the lower side face is greater than half a thickness of the touch pen.

8. The printing device according to claim 2, wherein at least a part of left and right of the lower side face communicates with outside at a same height as the lower side face.

9. The printing device according to claim 2, wherein the touch panel, the lower side face, and the wall are formed in a unified manner as a touch panel unit, and the touch panel unit tilts via a tilt mechanism.

10. The printing device according to claim 2, wherein a contactless charging mechanism is provided at the lower side face.

11. The printing device according to claim 1, wherein the top surface at least one of the left and right sides of the touch panel is provided on plane including a surface of the touch panel.

12. The printing device according to claim 1, wherein the top surface higher than a surface of the touch panel is absent at the upper side, the left side, and the right side of the touch panel.

13. The printing device according to claim 1, wherein the height of the wall is greater than a height of the top face of the case at the left side, the right side, and the upper side of the touch panel.

14. The printing device according to claim 1, wherein a cut-out in a size to fit a finger into it is formed at least at a part of the wall.

15. The printing device according to claim 1, wherein a mechanical switch is provided at one position, of positions above, below, to the left of, and to the right of the touch panel.

16. The printing device according to claim 15, wherein the mechanical switch includes at least one of a power switch, a power-saving switch, a print stop switch, and a home switch for returning a display on the touch panel to a basic screen.

17. The printing device according to claim 16, comprising:
   a light-emitting unit extending to a front from a right side edge part provided to the right of the touch panel or a left side edge part provided to the left, and
   a plurality of the mechanical switches, wherein the light-emitting unit is arranged along a direction in which the plurality of the mechanical switches are arrayed.

18. The printing device according to claim 15, comprising:
   a plurality of the mechanical switches, wherein
   a second switch arranged nearer to a back than a first switch, of the mechanical switches, is provided at a lower position in a vertical direction than the first switch.

19. The printing device according to claim 1, comprising:
   a light-emitting unit extending to a front from a right side edge part provided to the right of the touch panel or a left side edge part provided to the left.

20. The printing device according to claim 1, wherein
a main scanning direction or a sub scanning direction of the printing mechanism corresponds to a direction of a lateral side of the touch panel.

21. The printing device according to claim 1, further comprising:
a connector at a position within a range where the touch panel is arranged, in a lateral direction on a front face of the case.

* * * * *